United States Patent Office 3,427,377
Patented Feb. 11, 1969

3,427,377
COMPOSITION CONTAINING PENICILLIN AND DYE INDICATOR FOR TREATING UDDERS
Fritz Bauer, Bad Soden, Taunus, Peter Klatt, Kelkheim, Taunus, and Kurt Sellhorn, Frankfurt am Main, Germany, assignors to Farbwerke Hoechst Aktiengesellschaft vormals Meister Lucius & Bruning, Frankfurt am Main, Germany, a corporation of Germany
No Drawing. Filed Aug. 13, 1965, Ser. No. 479,619
Claims priority, application Germany, Aug. 19, 1964, F 43,782
U.S. Cl. 424—7    5 Claims
Int. Cl. A01j 1/00; A61k 21/00; A23c 7/00

ABSTRACT OF THE DISCLOSURE

A composition has been provided to detect in milk excreted penicillin which has been used in the treatment of udders. This composition comprises as the indicator for penicillin the dyestuff 2,4-disulfo-5-hydroxy-4′,4″-bis-(diethylamino)-triphenyl-carbinol (New Color Index No. 42051, Schultz No. 826, E.E.C. No. E131). Some of the advantages accruing from the use of said dyestuff are a consistent and proportional response to the amount of penicillin excreted and ability to visually detect and measure the excreted penicillin.

---

It is known to add dyestuffs to mastitis preparations which contain antibiotics as indicator of a contamination of the milk with antibiotics. The dyestuffs proposed for this purpose have the disadvantage that they are not excreted parallely with the antibiotics. As a consequence, this may have the effect that under unfavorable circumstances the milked milk is not colored although it contains antibiotics or that it is colored but does no longer contain antibiotics. Furthermore, in the case of penicillin concentrations of about 0.1 I.U./ml., these dyestuffs fail insofar as they do not permit a determination of the color of the milk with the naked eye. For the determination of concentrations of antibiotics which are smaller than the aforesaid concentration, ion exchange methods or microbiological tests are usually applied; these methods, however, are too complicated for general use.

The present invention provides a colored composition which contains antibiotics and an indicator and which is used for the treatment of the udders of dairy animals; this composition not only cures the disease, but it also indicates the excretion of antibiotics with the milk by coloring the milk according to the degree of contamination with antibiotics.

The present invention furthermore provides a process for the manufacture of such a composition, with comprises adding to the penicillin-containing, aqueous or oily suspensions the dyestuff Lebensmittelblau No. 3 in a quantity of 100–750 mg., preferably 250–500 mg., per dosage unit (for one teat), the proportion of penicillin to dyestuff being in the range of between 0.5 and 2:1, preferably between 0.5 and 1.2:1, I.U./µg, respectively.

After the treatment of the udders with the compositions of the invention, the penicillin is excreted by the udders parallely with the dyestuff so that penicillin concentrations of down to 0.03 I.U./ml. of milk can be determined with the naked eye by the color of the milk. A milk which contains penicillin in a concentration of 0.03 I.U./ml. is generally considered harmless; it can be further treated and consumed.

The dyestuff used according to the invention is an officially allowed food dyestuff and is free from harmful substances. It does not affect the tissue of the udders and also does not reduce the antibiotic activity of the antibiotics used.

The dyestuff Lebensmittelblau No. 3 used according to the invention is also known under the name Patentblau No. 5 and under the chemical designation 2,4-disulfo-5 - hydroxy - 4′,4″ - bis - (diethylamino) - triphenyl-carbinol (calcium salt). Furthermore, it is defined under Colour Index No. 42051, Schultz No. 826 and E.E.C. No. E131.

The preparations which may be colored with Lebensmittelblau No. 3 with the aforesaid effect include penicillin-containing, aqueous or oily suspensions. Under the term penicillin are to be understood all known types of penicillin and the salts thereof with any base. As example, there may be mentioned procaine-penicillin which has proved to be a highly effective antibiotic in the treatment of mastitis. In addition to penicillin, the preparations may also contain other antibiotics such as streptomycin, neomycin, dihydro-streptomycin, bacitracin and other antibacterially active substances such as sulfonamides or nitrofurane derivatives, as well as the additives usually applied in galenics, for example, solubilizers, adjuvants or stabilizers. Aqueous suspensions may also be combined with buffer substances for the regulation of the pH-value. For oily suspensions, there may be used as the basis all oils usually applied in galenics, for example glycerides such as castor oil or sesame oil or also mineral oils such as paraffin oil and correspondingly composed synthetic oils as well as mixtures of the aforesaid oils.

The treatment of the udders with the colored compositions prepared according to the present invention does not require special measures. The composition can be introduced by means of a suitable syringe through the teat canal into the milk system and milk ducts of the udder.

The animals which may be treated with the composition of the invention include all dairy animals, for example cows, ewes or goats, the milk of which is used for alimentary purposes.

After the treatment with the composition of the present invention, the milk of the animals treated shows a significant blue color which is recognizable with the naked eye all the time the penicillin content of the milk is not below the critical value of 0.03 I.U./ml. In addition, it is possible to quantitatively determine the degree of penicillin contamination of the milk by comparing the intensity of the color with that of a comparison scale.

The excretion of penicillin and of dyestuff into the milk may last one to several days, depending on the type of carrier substance and on the concentration of active substance. By reason of the parallelity of the excretion of penicillin and dyestuff in the system described, the milk obtained contains in any case as long as it is colored penicillin in a concentration above the tolerance limit and if it is not colored it does not contain the active substance in a harmful quantity.

The following examples illustrate some compositions of the invention, but they are not intended to limit it thereto.

Example 1

| | |
|---|---|
| Novocain-penicillin | mg__ 46.00 |
| Trisodium citrate | mg__ 15.00 |
| Lebensmittelblau No. 3 | mg__ 50.00 |
| Aqua dest. ad | ml__ 1.00 |

Example 2

| | |
|---|---|
| Novocain-penicillin | mg__ 46.00 |
| Dihydrostreptomycin sulfate | mg__ 29.00 |
| Trisodium citrate | mg__ 15.00 |
| Lebensmittelblau No. 3 | mg__ 50.00 |
| Aqua dest. ad | ml__ 1.00 |

Example 3

| | | |
|---|---|---|
| Novocain-penicillin | mg | 46.00 |
| Lebensmittelblau No. 3 | mg | 50.00 |
| Sesame oil ad | ml | 1.00 |

Example 4

| | | |
|---|---|---|
| Novocain-penicillin | mg | 46.00 |
| Dihydrostreptomycin sulfate | mg | 29.00 |
| Lebensmittelblau No. 3 | mg | 50.00 |
| Sesame oil ad | ml | 1.00 |

We claim:

1. A penicillin composition for the treatment of udders of dairy animals admixed with an indicator to show the presence of penicillin in milk during the period in which the antibiotic is excreted by the udders, said composition comprising as an indicator of the excreted penicillin the dyestuff 2,4-disulfo-5-hydroxy-4′,4″-bis-(diethylamino)-triphenyl-carbinol calcium salt in a quantity of 100–750 mg. per dosage unit (for one teat), the proportion of penicillin to dyestuff being in the range of between 0.5 and 2:1, I.U./μg., respectively.

2. A penicillin composition as defined in claim 1, said composition comprising the said dyestuff in a concentration of 250–500 mg per dosage unit (for one teat).

3. A penicillin composition as defined in claim 1, said composition comprising the penicillin and the dyestuff in a proportion from 0.8 to 1.2:1, I.U./μg., respectively.

4. A penicillin composition as defined in claim 1, said composition comprising in addition to the said indicator dyestuff and pencillin other antibiotics.

5. A penicillin composition as defined in claim 1, said composition comprising in addition to the said indicator dyestuff and penicillin, streptomycin, dihydrostreptomycin, neomycin, bacitracin, a sulfonamide or a nitrofurane derivative.

References Cited

The Veterinary Bulletin: vol. 32, 1962, pp. 114, 705 and 856 (Items Nos. 580, 3563, and 4357).

ALBERT T. MEYERS, *Primary Examiner.*

S. ROSEN, *Assistant Examiner.*

U.S. Cl. X.R.

424—271, 114